United States Patent [19]

Thomas et al.

[11] Patent Number: 4,532,914

[45] Date of Patent: Aug. 6, 1985

[54] PORTABLE LP SPACE HEATER

[75] Inventors: David Thomas; Eugene C. Briggs, both of Bowling Green, Ky.

[73] Assignee: Koehring Company, Brookfield, Wis.

[21] Appl. No.: 557,201

[22] Filed: Dec. 2, 1983

[51] Int. Cl.³ .............................................. F24H 3/02
[52] U.S. Cl. ............................ 126/110 C; 126/110 B; 432/222
[58] Field of Search .................... 126/90 R, 67, 72, 93, 126/6, 99 R, 116 R, 106, 109, 104 R, 110 B, 110 C; 431/127, 128, 201; 432/222

[56] References Cited

U.S. PATENT DOCUMENTS

| | | | |
|---|---|---|---|
| 3,645,512 | 2/1972 | Dent et al. | 126/110 C X |
| 4,089,642 | 5/1978 | Briggs et al. | 126/110 B X |
| 4,244,349 | 1/1981 | Velie et al. | 126/110 C |
| 4,313,417 | 2/1982 | Briggs et al. | 126/110 B |

*Primary Examiner*—Larry Jones
*Attorney, Agent, or Firm*—Jerome P. Bloom

[57] ABSTRACT

A portable LP gas heater includes a combustion chamber the discharge end of which is open and unobstructed and the inlet end of which is defined by a rear head plate having a central primary air inlet into which projects, to a limited degree, a cylindrical fuel nozzle. The projected extremity of the nozzle which positions within the combustion chamber mounts a transversely disposed baffle which is parallel to and spaced preferably about one inch from the rear head plate. Fuel exits from and about the nozzle immediately adjacent and upstream of the baffle. The baffle has a size which permits it to be introduced to and removed from the combustion chamber by way of the primary air inlet. The rear head is further distinguished by a single group of apertures located adjacent its outer periphery in a substantially ring-like pattern. The outermost face of the rear head mounts, in addition to the nozzle bracket, a pair of fins arranged to receive and induce a smooth swirling movement of the primary air to and through its central inlet. The manner of application of the primary air induces a swirling high velocity flow thereof about the nozzle to pick up fuel immediately as it exits therefrom and immediately thereafter impact therewith upon the baffle, producing a substantial breakdown of the fuel and a violent turbulent reaction of the air, within which the fuel is thoroughly disseminated and moved immediately outward of the baffle.

23 Claims, 5 Drawing Figures

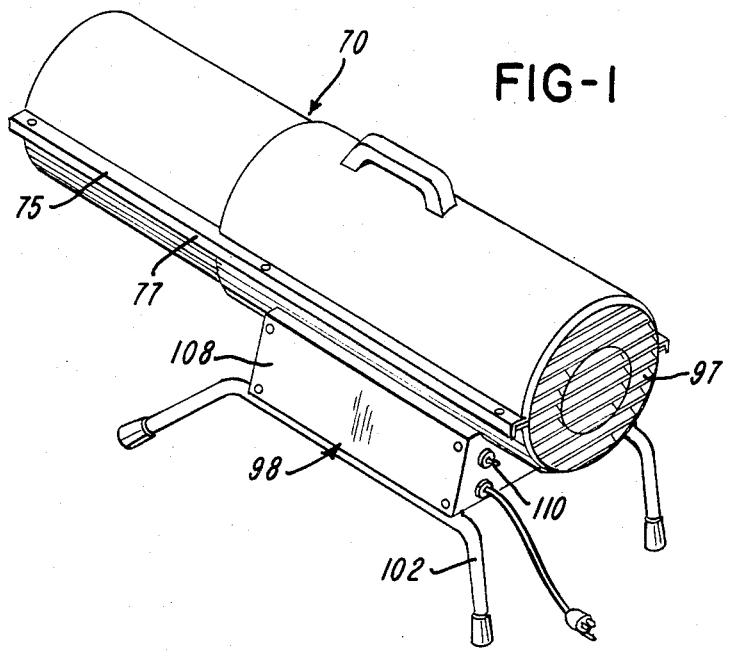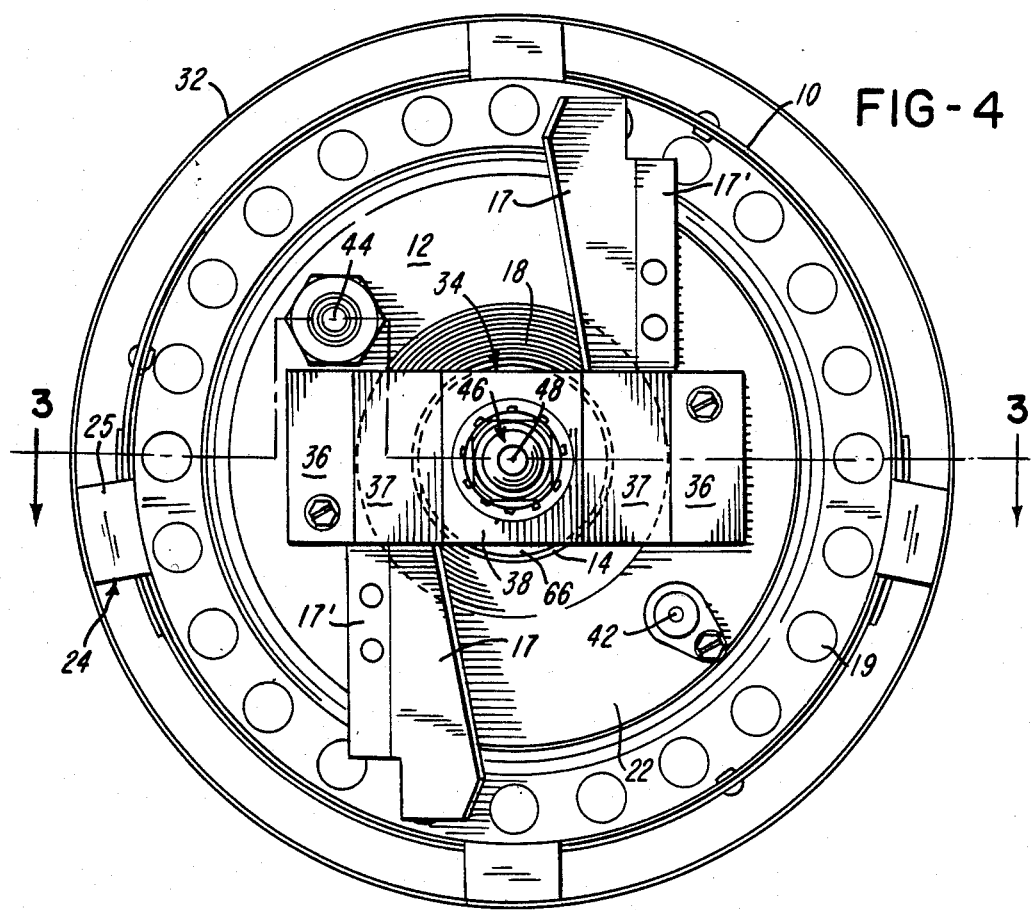

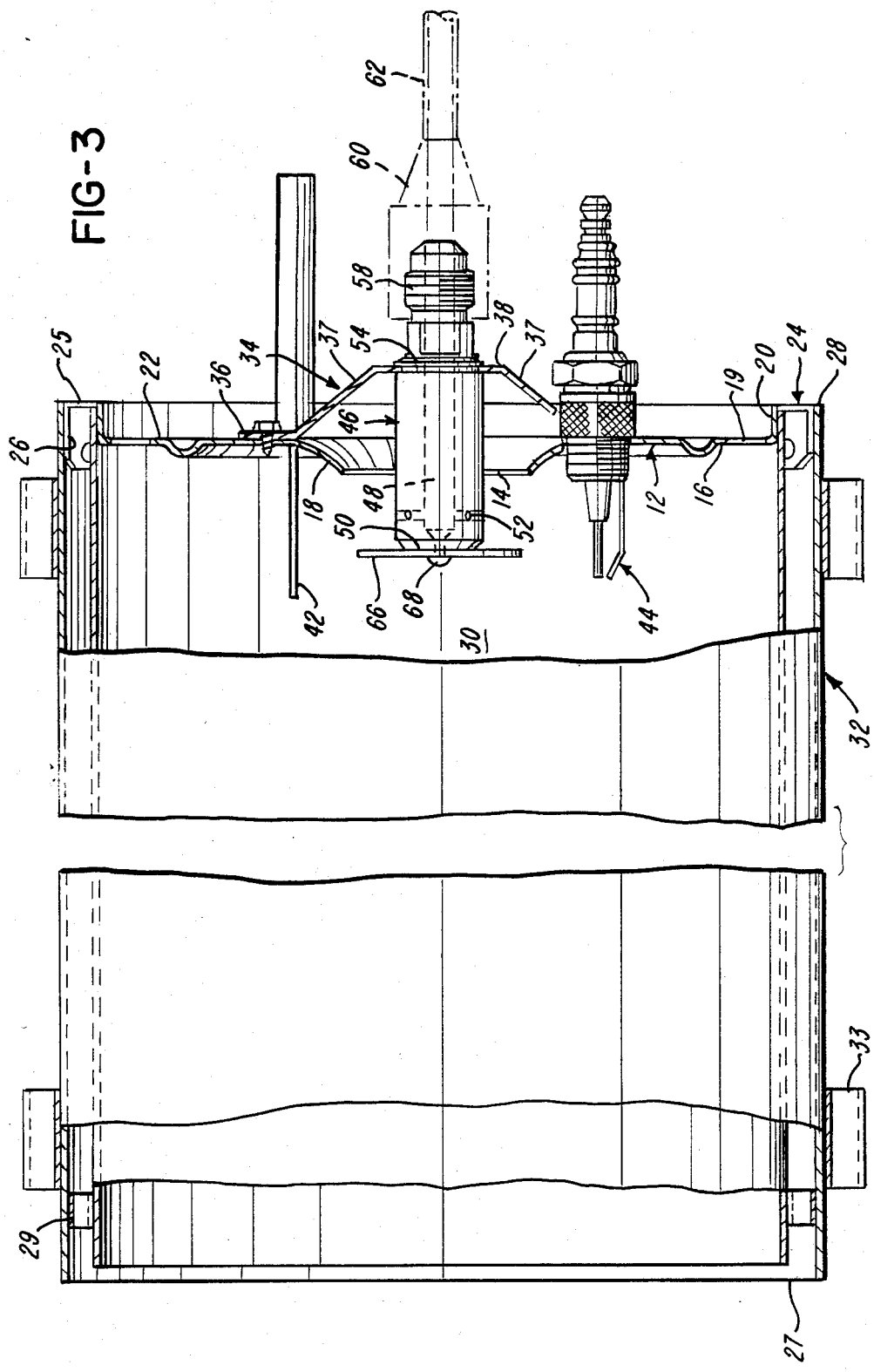

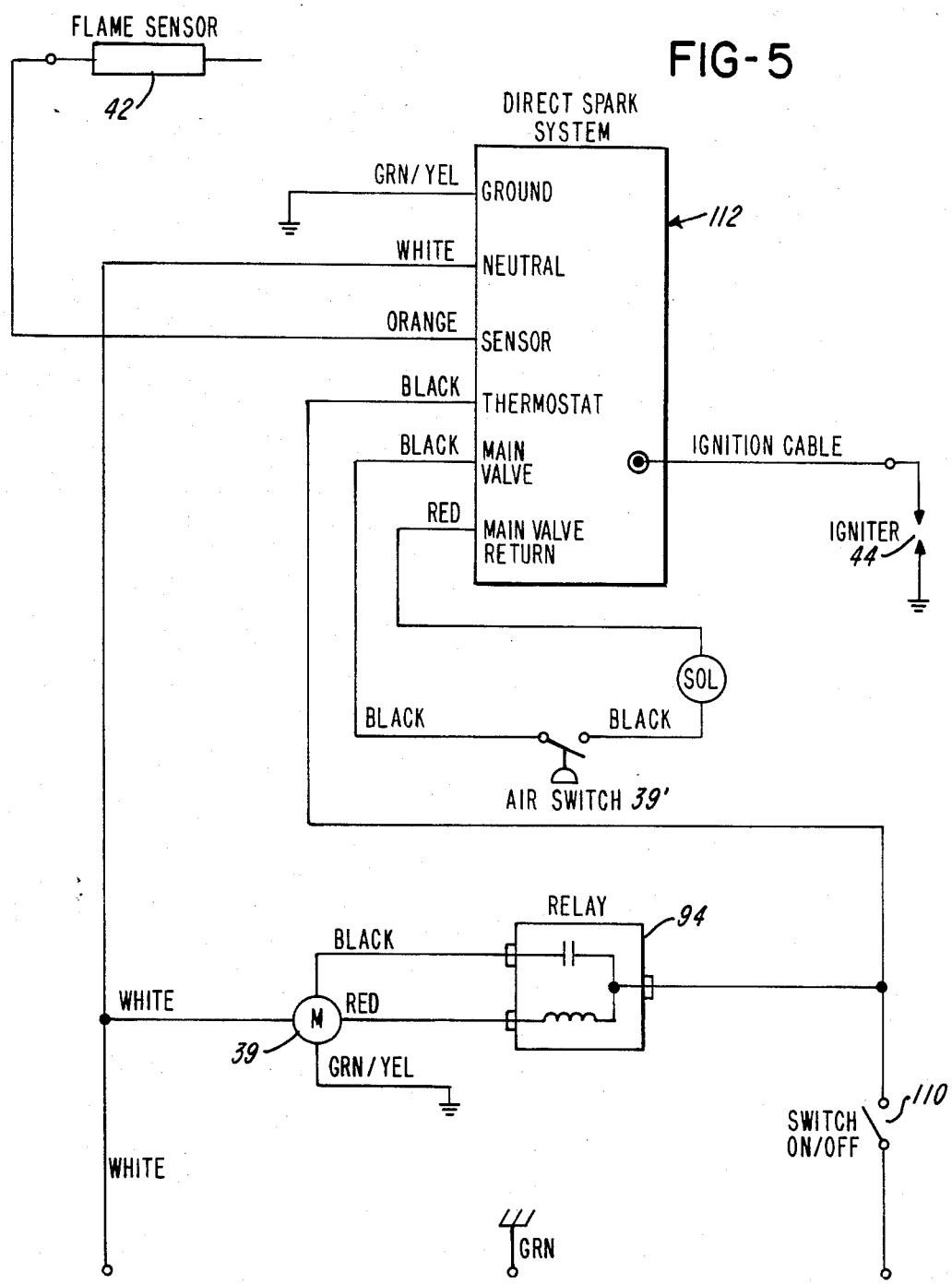

PORTABLE LP SPACE HEATER

BACKGROUND OF THE INVENTION

This invention relates to improvements in the construction, design and performance of portable heaters, particularly those which use LP gas as a fuel. Accordingly, it will be herein illustrated in this context, by way of example and not by way of limitation. The improvements of this invention solve and alleviate a number of problems evidenced in the use of prior art portable heaters of this type. Such problems include and have included one or more of the following:

a. difficulties in the manufacture and/or assembly of critically related parts;
b. difficulties in achieving an effective and consistent pattern in the mixing of air and fuel so as to insure proper performance as to combustion;
c. difficulties in achieving flame retention to the rear head of the combustion chamber;
d. ignition problems;
e. difficulties in insuring safety as to use. The incidence and degree thereof have limited the application and usage of LP gas burning portable heaters.

The above and other problems are solved in use of embodiments of the present invention.

As a matter of fact, the present invention enables LP gas burning portable heaters to have a range of BTU output and safety in use which significantly exceeds that believed possible at the price level at which these heaters can be sold.

The prior art which appears to be most pertinent as far as the present inventors are aware consists of the following U.S. Pat. Nos. 4,244,349, Velie et al. Jan. 13, 1981; 3,645,512, Dent, Feb. 29, 1972.

Velie et al shows the use of a multi-apertured rear head for a combustion chamber projected inwardly of which is a fuel nozzle. There is a flame spreader. However, Velie et al requires the use of two combustion chambers and the rear head employed is required to have a multiplicity of rings of apertures which are critically spaced in a radial sense. Furthermore, Velie et al insist on the criticality of a particular dimensional relation of parts which the present invention denies, thus negating special pertinence on its part.

Dent shows a rear head for a combustion chamber having four right angled air scoops in connection with and circularly spaced on its outer face in a concentric relation to its intake opening 26 and a nozzle which is dictated to be hexagonally configured in cross section for a critically positioned application thereof to its mounting plate. Dent also requires a baffle at the outlet end of its combustion chamber.

As will be seen the disclosures of the noted patents offer background information but neither reveal or anticipate the points of novelty of the present invention.

Attention is also directed to U.S. Pat. No. 4,313,417 and application for U.S. Pat. No. 384,868 to which reference is made in respect to certain known detail of the heater herein illustrated. However their disclosures are not pertinent to the points of novelty herein set forth.

SUMMARY OF THE INVENTION

Embodiments of the present invention are economical to fabricate, more efficient and satisfactory and safer in use and correspondingly adaptable to a greater variety of applications than heretofore contemplated for LP gas burning portable heaters. Their primary features comprise a construction, association and interrelation of a rear head of a combustion chamber, a fuel nozzle and a flame spreader which (a) facilitates a simple, quick and easy assembly of these parts; (b) enables a maximized and more effective mixing facility and utilization of primary and secondary air; (c) effects an assured retention of the developed flame to the rear of the combustion chamber and within approximately the rear half of the combustion chamber; (d) eliminates chance of explosion; (e) reduces temperature level of housing to safer level; (f) eliminates need for baffles or nose cones at the discharge end of the combustion chamber; (g) enables the use of a simple nozzle with no criticality as to its relative position for use; and (h) increases BTU output ratings in a simple and effective manner.

A most preferred embodiment of the invention utilizes a cylindrically configured nozzle having a central blind bore extending forwardly from its rear end to which a fuel delivery line is connected. The forwardmost or delivery end of the blind bore commonly opens to the radially innermost ends of a plurality of radially oriented outwardly directed small diameter discharge passages. The plane of these discharge passages will be spaced from 0.25 to 0.40 of an inch from the plane of a transversely disposed spreader plate at the discharge end of the nozzle which is positioned immediately inward of the combustion chamber of the heater of which it forms a part. The spreader plate will have a diameter the dimension of which is in the neighborhood of twice that of the fuel nozzle.

Preferred embodiments will also feature secondary air inlets formed by a group of apertures in the rear head or end plate of the combustion chamber which are arranged in a single substantially ring-like configuration encircling the fuel nozzle and the primary air inlet. Most preferredly the secondary air inlets will be adjacent the peripheral wall of the combustion chamber.

A further embodiment of the invention provides an apparatus particularly advantageous for use in a portable heater utilizing LP gas or its equivalent as a fuel comprising means defining a combustion chamber having an inlet end and a discharge end wherein the inlet end has an inlet opening for the delivery therethrough of the primary air required for support of combustion within said chamber. A nozzle associated with the combustion chamber has means for connection thereof to a supply of fuel and to deliver fuel therefrom by way of a portion of the nozzle which is projected inwardly of said primary air inlet opening to said combustion chamber. Also included are means for the ignition of the fuel in the presence of the primary air delivered to said chamber. Located upstream of the combustion chamber is the means for producing a pressured flow of air to its inlet end. The inlet end of the chamber is constructed to have therein a single group of apertures for the delivery of secondary air. These apertures are commonly disposed in a substantially circularly spaced relation about and so as to be individually spaced from said primary air inlet opening. The means for delivery of a pressured flow of air is arranged to direct air to and through the primary and secondary air inlets. There is also means defining a surface within the combustion chamber immediately of and transverse to the line of the nozzle, in a closely adjacent relation to the fuel discharged therefrom and in line with the primary air inlet opening. In the delivery of the pressured flow of air the arrangement described is such to provide that air will move through the primary air inlet opening and pass immediately of the nozzle, in intersecting relation to the fuel exiting therefrom immediately before impacting on the aforesaid transverse surface. The incoming primary air inherently picks up the intersected fuel and causes it to commonly and immediately impact therewith on said transverse surface. This impact is direct and produces a very high degree of turbulence of the air immediately of the transverse surface as well as a substantially simultaneous breaking up and dissipation of the fuel within the highly turbulent air. This produces an immediate and unusual degree of mixing of the fuel and air, which mixing is very quickly followed by a lateral spread thereof in a direction so as to cause the mixture to move outwardly to and slightly beyond the outer limits of the transverse surface, at which point there is substantially instant ignition of the fuel. The construction and arrangement and the limitation as to the position of the secondary air inlets in a substantially single encircling ring formation produces an encircling protective and supportive layer of secondary air which is carried the length of the combustion chamber and outwardly thereof through the discharge end of the tubular shell which defines its peripheral wall surface. This protective layer of secondary air supports and protects as well as influences the turbulent intermixture of gas and air developed between the rear head of the combustion chamber and the aforesaid transverse surface to bend as it moves outwardly from the outer limit of the transverse surface to be immediately ignited at that point and similarly supports and protectively envelops the flame so produced as it projects forwardly of the combustion chamber to a limited degree. The construction and arrangement of the parts unexpectedly and inobviously influences improved flame retention characteristics.

Another embodiment of the invention provides similarly advantageous apparatus including means defining a combustion chamber having an inlet end and a discharge end, the former having an air inlet opening for delivery therethrough of primary air required to support combustion of fuel within said chamber. Also included is a substantially cylindrical nozzle adapted for connection to a supply of fuel and formed to direct fuel therethrough and discharge the same laterally thereof. Means are provided upstream of said nozzle for delivery of a pressured flow of air to and through the primary air inlet opening and about the nozzle, the downstream end of which projects through said inlet opening. Means are also provided to define a surface within the combustion chamber immediately of and transverse to the downstream end of said nozzle which terminates adjacent said primary air inlet opening. Ignition means are arranged to produce a spark immediately outward of the outer peripheral limit of said transversely disposed surface. The construction provides that primary air, under pressure passes to and directly about the nozzle to intersect the laterally discharging fuel immediately of the transverse surface to carry therewith the intersected fuel so they substantially immediately commonly impact on the transverse surface, disseminating the fuel in the primary air which is then in a highly turbulent condition, producing thereby a high degree of intermixture of fuel and air. This intermixture spreads laterally and outwardly of the transverse surface at a high velocity to immediately ignite in a condition facilitating complete combustion.

Most preferred embodiments of the invention will, in total or part include various details of construction referred to above in this summary of the invention.

It is therefore a primary object of this invention to provide heater apparatus particularly advantageous for use in LP gas burning portable heaters rendering the same economical to fabricate, more efficient and satisfactory in use, adaptable to a greater variety of applications, and unlikely to malfunction.

Another object is to provide such apparatus with particular improvements in the construction and function of their combustion chamber assembly.

A further object is to provide an improved assembly of a nozzle, a flame spreader and a combustion chamber providing improvements in combustion, in flame retention characteristics and improved safety in use thereof.

An additional object of the invention is to provide heater apparatus particularly advantageous for use in an LP gas burning portable heater possessing the advantageous structural features, the inherent meritorious characteristics and the means and mode of use herein described.

With the above and other objects in view as will more fully appear in the specification, the invention intended to be protected by Letters Patent consists of the features of construction, the parts and combinations thereof, and the mode of operation as hereinafter described or illustrated in the accompanying drawings, or their equivalents.

Referring to the accompanying drawing wherein is shown one but not the only embodiment of the invention, FIG. 1 is a perspective view of a portable heater per the present invention;

FIG. 3 is a view of the assembly of the combustion chamber and the interrelated heat shield shown partly in section, parts being eliminated for clarity of disclosure;

FIG. 4 is a view taken on line 4—4 of FIG. 3; and

FIG. 5 is a schematic of the heater control circuit.

Like parts are indicated by similar characters of reference throughout the several views.

Figure 2:
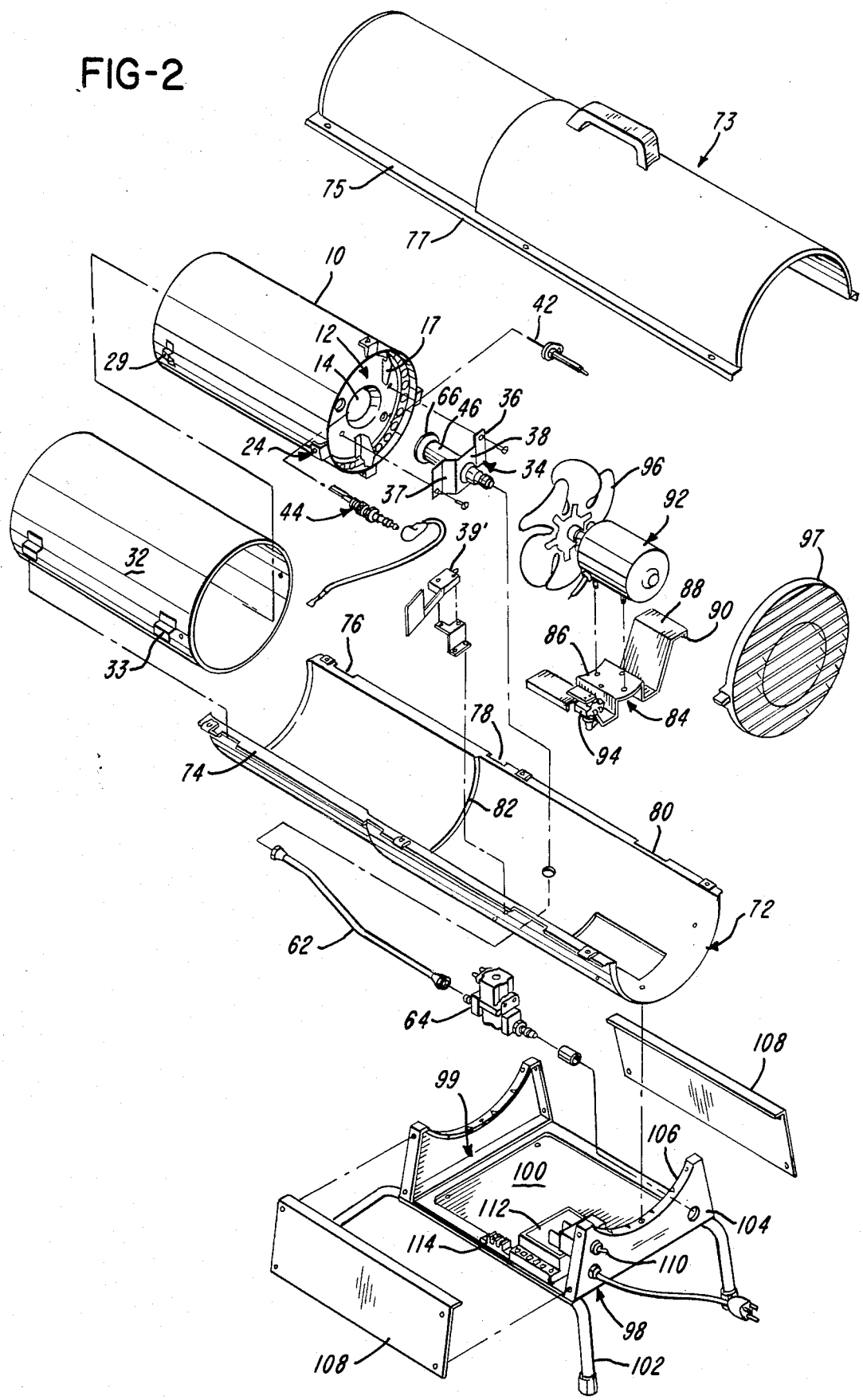
FIG. 2 is an exploded view of the heater illustrating its parts.

Referring to the drawings, a combustion chamber per the present invention very simply comprises a tubular shell 10 having a cylindrical configuration and a substantially annular rear head plate 12. The shell 10 is substantially uniform as to its wall thickness and its internal and external diameters and its interior cross section are each uniform as well.

The radially innermost portion of the plate 12, including its innermost edge which bounds its central aperture 14, is flared outwardly of one face 16 thereof to form thereon a conically convergent projection 18. The axial and radial extent of the projection 18 is very short. A radially outermost circumferentially extending portion 20 of the plate 12, the radial extent of which is also very short, is bent to project essentially perpendicular to, outwardly from and to produce a skirt on, integral with, essentially perpendicular to and in bounding relation to the opposite face 22 of the plate 12. The skirt portion 20 has a short axial extent, is concentric with the aperture 14, and projects in a direction opposite to that of the projection 18.

Four right angled brackets 24 are formed on the outwardly projected edge of the skirt portion 20 and integral therewith. The brackets are equidistantly spaced circumferentially of the skirt so as to position 90° apart. Each bracket 24 is identical and produced by a tab-like outwardly directed radial extension of a short portion of the projected edge of the skirt 20 a first portion 25 of which projects radially outward in a plane parallel to that of the plate 12 and a second and outermost portion 26 of which is bent at right angles to the first in a direction towards, perpendicular to and somewhat beyond the plane of the plate 12. As will be seen in viewing the face 22, in cross section the bracket portions 26 lie in a circle having a uniform radius the center of which is on a line perpendicular to the plate 12, at its center.

The shell 10 has what may be considered a discharge end 27 and an inlet end 28. Fixed on its outer surface, at each of respectively diametrically opposite locations, is a spacer bracket 29. The brackets 29 are in an adjacent and equidistantly spaced relation to the discharge end 27.

In the assembly thereof the plate 12 is presented to the open inlet end 28 of the shell 10 with its face 16 most adjacent the interior of the shell. The dimension and configuration of the outer peripheral surface of the skirt 20 is made complementary to the dimension and configuration of the cross section of the inner surface of shell 10 at its inlet end. This facilitates the direct press fit of the plate 12 into the inlet end of the shell 10. The plate 12 is thus positioned and fixed to bridge and cap the rear end of the shell 10 and form therewith a combustion chamber 30. In the assembly of the plate 12, as described, the portions 25 of the brackets 24 seat in complementary notches in the edge of the shell 10 at its inlet end 28. At the same time the bracket portions 26 position in a concentric closely spaced relation to the outer surface of the shell 10. The outermost surfaces of the bracket portions 26 and the outermost surfaces of the brackets 29 are equally spaced from the outermost surface of the shell 10 and serve as bearing surfaces for a tubular heat shield 32. The shield 32 is secured in a concentric closely spaced relation to, coextensively with and projects somewhat beyond the discharge end of the shell 10.

Four right angled brackets 33 fixed to and projected radially from the outer surface of the shield 32 are arranged in pairs with the brackets of each pair diametrically aligned and with the pairs in a directly aligned and longitudinally spaced relation. What may be considered the radially innermost portions of the brackets 33 connect to and project radially outward of the shield 32 in the same diametral plane. The radially outermost portion of each bracket 33 identically depends perpendicular to the projected extremity of its radially innermost portion. As will be seen, the brackets 33 facilitate a drop fit of the assembly of the shield and combustion chamber assembly to the lower half of the heater housing.

Fixed to the face 22 of the plate 12, prior to its assembly to the shell 10, is a narrow rectangular strap-like element which serves as a nozzle bracket 34. The bracket 34 is applied in a balanced diametrically extending bridging relation to the central aperture 14 so as to have equal end portions 36 thereof seat on and be fixed to the face 22 at locations spaced equidistant from the center of this aperture. At the same time a short central portion 38 of the length of the strap-like bracket is offset to position outwardly from, rearwardly of and parallel to the face 22 to establish an aperture 40 located centrally thereof in a coaxial alignment with the aperture 14. By reason of the offset therein the portions 37 of the strap-like bracket 34, between the central and the end portions of its length, symmetrically diverge as they extend from the respective extremities of the portion 38 to the end portions 36.

The plate 12 is also distinguished by a single substantially ring-like arrangement of apertures 19. The apertures 19 are in a closely spaced relation and define, substantially, a circle thereof which is positioned adjacent the outer peripheral edge of the plate 12 immediately inward of the skirt 20 and in a concentric radially spaced relation to the aperture 14. Other than the apertures 14 and 19, the plate 12 in this instance has only the following apertures: (1) an aperture for the projection therethrough and the mounting thereto of a flame sensor 42; (2) an aperture for the projection therethrough and the mounting thereto of a spark plug used for ignition purposes; and (3) apertures for the application of screws to mount the bracket 34 and two air deflectors to the face 22 of the plate 12. These air deflectors each comprise a fin-like plate portion 17 having at and along one edge thereof an integral, narrow, generally rectangular base portion 17' forming therewith an angle of 120°. As will be seen in the orientation shown in FIG. 4 of the drawings, one of the deflectors is positioned within the upper right hand quadrant of the plate 12, in connection with the face 22 thereof, and the other is fixed to the face 22 within the left lower quadrant thereof. As shown, the longitudinal extent of the base portion 17' is positioned in each case essentially between one of the vertical limits of the bracket 34 and the ring of apertures 19, essentially perpendicular to the horizontal line of the bracket. As thus mounted, the deflectors are in a vertically spaced, laterally offset, generally parallel relation, as well as equidistant from the central vertical longitudinally extending plane of the combustion chamber assembly. The relative orientation of the fin portions 17 with respect to their base portions 17' causes them to incline toward each other and to the central vertical longitudinally extending plane of the combustion chamber. The purpose and function of the fins 17 will be further described.

The bracket 34 mounts a fuel nozzle 46 which has a generally cylindrical configuration and a central, longitudinally extending blind bore 48. The bore 48 opens from what may be considered the fuel inlet end of the nozzle and terminates adjacent but short of its opposite end 50. The innermost end of the bore 48 opens to the radially innermost ends of six radially oriented, outwardly directed, small bore discharge passages 52 which are essentially co-planar. The outlets or exit openings from the passages 52 are essentially equidistantly and circumferentially spaced with reference to the outer peripheral surface of the nozzle. In the case illustrated the end 50 is defined by a flat planar surface which is perpendicular to the longitudinal axis of the nozzle. The diameter of the nozzle is uniform and a maximum along a section of its length which extends rearwardly from a point substantially immediately adjacent the extremity 50, in the direction of the inlet end of the nozzle, for a distance somewhat greater than one-half its length, at which point there is a sudden reduction in its diameter to produce thereon an annular shoulder 54 facing in the direction of the inlet end of the nozzle. This reduction in diameter is variously maintained to the inlet end of the nozzle, immediately forward of which a relatively short section 58 of the length of the nozzle is provided with an external thread. The latter facilitates the coupling to the nozzle of an adapter 60 at the delivery end of a fuel supply tube 62. The opposite end of the tube 62 is coupled to a fuel supply which is external to the heater through the medium of an intervening solenoid valve 64.

The nozzle 46 will be applied to the bracket 34 prior to the fixing of the bracket to the plate 12. To this end the reduced diameter inlet end portion of the nozzle will be projected through the aperture 40 from the face of the bracket which will directly face the aperture 14 in the mount thereof to the plate 12. When the shoulder 54 is brought into a face abutting relation to the bracket, a suitable ring-shaped retainer is then applied over the reduced diameter portion of the nozzle to clamp against the surface portion of the bracket which is opposite that abutted by the shoulder 54. In this way the nozzle 46 is centered on and releasably fixed to project perpendicular to the bracket's central portion 38.

A disc-like washer-type baffle plate 66, sometimes referred to as a "flame spreader," is fixed coaxially of and in a face abutting relation to the planar end surface 50 of the nozzle 46 by means of a headed drive stud 68. As will be seen the plate 66 projects about and radially of the end 50 of the nozzle to a limited degree and its radial extent is such that it is less than that of the aperture 14 to which it coaxially relates. Thus according to the present invention the diameter of the baffle 66 has, in this instance, a dimension permitting it to freely pass through the aperture 14 in the plate 12, as will be obvious from FIG. 3 of the drawings.

The arrangement just described provides a simply comprised sub-assembly embodying the bracket 34, nozzle 46 and baffle plate 66 the total of which may be simply and quickly applied to the plate 12 as a unit and in the process of the application of the bracket 34 and its associated structure to the plate 12 the nozzle and the baffle are projected through and substantially coaxial with the aperture 14 from what constitutes the rear of the combustion chamber as and when the plate 12 is fixed in and to the inlet end of the shell 10.

Attention is directed to the fact that the dimension and position of the bracket 34 and the axial length of that portion of the nozzle to the combustion chamber side of the bracket as applied to the plate 12 is such that the discharge end portion of the nozzle projects through and inwardly of the center of the plate 12 and into the combustion chamber to position the fuel discharge bores 52 and the baffle 66 immediately within the combustion chamber, clear of and closely adjacent the rear head thereof.

More particularly, in preferred embodiments of the invention such as described the exits from the nozzle discharge passages 52 will lie in a plane which will be spaced from the adjacent substantially parallel planar surface of the baffle 66 a distance which may range from about 0.025 to 0.40 inch. Furthermore, the span or diameter of the baffle will preferably be of a dimension to have a ratio of 2 to 1 with reference to the maximum diameter or span of the cross section of that portion of the nozzle between the plate 12 and the baffle 66, in their relatively assembled condition. It has been found that holding the dimension of the baffle so its diameter or span is from 1.9 to 2.1 that of the cross section of the nozzle indicated, there is an optimal utilization of primary air delivered to the combustion chamber by way of the aperture 14. This will be further described. It is noted that the proportions and relationships indicated have been found to be particularly advantageous as applied to LP gas burning heaters to achieve, in fact, BTU output ratings which are substantially higher than would have been normally anticipated, giving due consideration to the prior art. In addition, considering the combustion chamber assembly as fully assembled, under such conditions the baffle 66 will, for significant and beneficial results, be established so as to be spaced from the plate 12 a distance of approximately 1 inch.

To illustrate a preferred form of heater in which the improved construction of the present invention above described may be effectively and beneficially utilized, attention is directed to FIG. 2 of the drawings. The housing of the heater there illustrated is provided by a generally cylindrical shell 70 which has a substantially uniform wall thickness, inner and outer wall surfaces of complementary configuration and a single step in its diameter between what may be considered its air inlet end and its air outlet end. This step is somewhat more closely adjacent the outlet end of the housing than its inlet end and produces, on its inner surface, a sloping shoulder 82 facing the inlet end of the housing. The interior cross section of the shell is uniform from the shoulder 82 to its inlet end and here exhibits its maximum dimension. The interior cross section of the housing from the shoulder 82 to its outlet end is also uniform but somewhat reduced as to its dimension.

The shell 70, moreover, is a diametrically split structure comprised of two longitudinally extending separate portions, one of which constitutes its lower half 72 and the other its upper half 73. Each of these half portions has a generally hemi-cylindrical configuration. The diametrically opposite edges of what constitutes the lower half 72 are each provided with an outwardly directed flange 74. Flanges 74 are co-planar and each is provided with an identical series of three longitudinally spaced generally rectangular notches, respectively 76, 78 and 80.

As may be seen, the lower half of the shell 70 constitutes a hemispherical trough which nests in part the essential operative components of the heater. The combustion chamber assembly of the invention, together with the interconnected heat shield 32, is drop fit to the lower half 72 of the heater housing by having the portions of the brackets 33 which project radially outward of the shield 32 overlie the flanges 74 at the locations of their notches 76 and 78 and the projected extremities of the brackets 33 depend within and bridge the longitudinally spaced edges of these notches. In such fashion the combustion chamber assembly together with its encompassing heat shield is not only positioned in a partially nested relation to the lower half of the housing but restrained from an axial movement with respect thereto. As thus positioned, this assembly extends from a point immediately inward from the outlet of the housing 70 rearwardly to and slightly beyond the shoulder 82.

A strap-like saddle member 84 is provided by a relatively narrow, longitudinally extended, generally rectangular strip of metal which is depressed at the central portion of its length to form therein a pocket 86 the laterally spaced side walls 87 of which are upwardly and outwardly divergent from its base and respectively provided with co-planar lateral extensions 88 of their upper edges having hook-like dependent extremities 90 to form thereon the equivalent of the brackets 33. In the assembly thereof the saddle 84 positions transversely of the lower half 72 of the housing to have its lateral extensions 88 overlie the flanges 74 and their hook-like extremities 90 depend between and in bridging relation to the longitudinally spaced edges of the notches 80. The saddle 84 is thus inhibited from movement lengthwise of the housing.

A motor 92 is seated on and releasably secured to a complementarily curved relatively elevated central portion of the base of the pocket 86. The motor drive shaft is relatively projected, to a limited degree, at that end thereof which is most adjacent the combustion chamber assembly as the underlying saddle member 84, to which it is secured, is seated to the lower half 72 of the housing as above described. This projected end of the motor drive shaft mounts in releasably secured relation thereto a fan assembly 96 which is thus positioned upstream of and in coaxial relation with the aperture 14 constituting the primary air inlet of the combustion chamber. The radial extent of the fan assembly 96 is such that, upon the energization of the motor 92 and its corresponding rotation, its outer peripheral limit will move in a closely adjacent relation to the inner wall surface of the heater housing, by which the fan is contained. Interconnected with and projected inwardly of the inner wall surface of the lower half of the housing 70, immediately downstream from the fan 96, is an air switch 39'. The switch 39' has an operating element which embodies a sail device arranged to position in the path of the flow of air developed by the fan 96 upon the energization of the motor 92. The switch 39' is embodied in a control circuit which includes the solenoid which operates the valve 64 and is so designed as to influence the solenoid to induce a closing of the valve 64 at any time in which the air switch senses the absence of or an inadequate flow of air under pressure to and through the housing 70.

The lower half 72 of the housing has a rectangular opening 79 therein immediately adjacent and forward of its inlet end. The opening 79 is laterally centered and positioned below the location of the saddle member 84 and motor 92. A small aperture immediately forward of the opening 79 in the bottom of the housing accommodates the projection therethrough of the fuel delivery line 62, the adapter 64 of which is coupled to the inlet end of the nozzle 46.

A grill 97, designed to bridge the inlet end of the housing 70, has a circular frame portion embodying a pair of diametrically opposite, outwardly projected, radial flanges which seat to the flanges 74 as its lower half bridges the air inlet end of the housing half 72.

When the variously required parts are seated to the lower half 72, as described, the upper half 73 of the housing is then superposed to contain these parts and clamp them in place. To this end, the upper half 73 has its diametrically opposite edges, which are positioned lowermost in the application thereof to the half 72, provided with integral, coextensive, co-planar outwardly directed flanges 75. The width of each flange 75 is slightly greater than that of the flanges 74 and the outer extremity of each has a coextensive dependent flange portion 77. It is noted that the flanges 75 are devoid of notches but they do have longitudinally spaced apertures. In superposition of the flanges 75 on the flanges 74 the apertures therein align with similar apertures in the flanges 74 to accommodate the projection therethrough of screws or other devices by means of which the flanges are secured together to clamp interposed positions of the brackets 33, strap portions 88 and grill 97, together with appropriately applied sealing strips, therebetween. As the flanges 74 and 75 to either side of the housing are secured together, the dependent flange portions 77 on the flanges 75 overlie and immediately contain the outermost edge portions of the flanges 74.

Referring to FIGS. 1 and 2 of the drawings, the housing 70 is shown to seat on a footed saddle the longitudinal extent of which is substantially centered between the inlet end of the housing and the location of the shoulder 82. This saddle comprises a footed rectangular plate 100. Rising upwardly of and perpendicular to each of the opposite end portions of the upper surface of the plate 100 is an identical, peripherally flanged, transversely disposed plate 104. The plates 104 are parallel and their peripheral flanges, which project from their adjacent faces, are directly aligned. The peripheral outline of each plate 104 exhibits a horizontally disposed base, and sides which symmetrically and equally extend from the base in an upwardly convergent relation. This peripheral outline is completed by a line, defined by the uppermost flanged edge portion of the plate 104, which has the major portion of its length, centered between its ends, arcuately depressed on a uniform radius and its end portions parallel to its base.

As thus formed the plates 104 provide, through the medium of the arcuately formed depressed portions 106 of their flanged upper edges, a base for seating longitudinally spaced portions of the bottom of the housing 70 and thereby a mount of the housing to its saddle. Once seated, the housing 70 is suitably secured to the flange portions of the plates 104 thereunder. The feet which stably mount the heater housing and the plate 100 are provided by two lengths of structural tubing fixed to extend immediately under and longitudinally of the respective lateral extremities of the plate 100 to dispose this extent in a substantially parallel relation. The respective lengths of tubing project beyond the respective ends of the plate 100 and their projected extremities are bent downwardly and outwardly to form thereby four relatively divergent legs 102 which provide the feet by means of which the total heater structure is stably supported as and where set.

A plate 108 is applied over and releasably secured in a bridging relation to the longitudinally spaced side flanges of the plates 104 at each of their lateral extremities. The lowermost edge of each plate 104 is seated to the upper surface of the plate 100 and its uppermost extremity is formed as a bent over flange which overlaps the adjacent end portions of the flanged upper edges of the longitudinally spaced plates 104 at the side to which it applies and extends inwardly thereof to the adjacent limits of their depressed portions 106.

Thus, upon the seating of the housing 70 to its saddle 98 and the application of side plates 108, the plate 100, end plates 104, side plates 108 and that portion of the housing which bridges the end plates and side plates form a compartment 99 ready access to which is provided by release of one or both the side plates 108. Moreover, the portion of the bottom of the housing which caps the compartment 99 is inclusive of the opening 79 and that aperture which accommodates the projection therethrough of the fuel delivery line 62.

Note that the solenoid operated fuel valve 64 is mounted within the compartment 99, in connection with one of the plates 104. As will be seen from FIG. 2, this facilitates its ready coupling to an external supply of fuel by way of an appropriate delivery line. The compartment 99 also contains an on-off switch 110, a terminal board 114 and a basic control unit 112, through the medium of which power is applied to the flame sensor 42, the igniter 44 and the solenoid of the valve 64, as and when required. In this respct the circuitry required for the operation of the heater is schematically shown in FIG. 5 of the drawings. As will be obvious the opening 79 provides a simple and direct means for the passage and connection of all the individual wires which lead to and from the variously included equipment requiring the application of power for its function.

It should be understood that the details of the controls applied have been limited and described only to the extent deemed necessary for an understanding of the present invention. Such details and elements as are not explicitly set forth should be readily obvious to those versed in the art.

In the operation of the above described heater, once the motor and the various other controls required to this end are energized, the fan assembly 96 will be rotated at a high speed to draw air into the inlet end of the housing and across the opening 79 and produce a pressured flow thereof to the plate 12, to and through the primary air inlet opening 14 and the apertures 19 and to and through the annular passage defined between the shell 10 and the heat shield 32 and that defined between the shield 32 and the housing 70.

More specifically, the air drawn inwardly of the housing 70 immediately upstream of the fan assembly is relatively cool, by virtue of which the cool layer thereof which flows across the opening 79 and that aperture which accommodates the passage of the fuel supply line 62 insulates the variously required controls, terminals and wiring connections within the compartment 99 from the heat of combustion produced during the operation of the heater.

The pressured flow of air downstream of the fan assembly in that chamber defined between the fan assembly and the plate 12 produces within such chamber a high degree of static pressure since the outlets therefrom are limited, thus insuring the maintenance of a generally uniform pressured flow and high velocity of the air which passes to and through its various outlets. That portion of the air which is directed to the primary air inlet opening 14 and the portion of the face 22 of the plate 22 which immediately bounds the same is very simple and effectively angularly deflected by the fins 17 to cause it to move inwardly of the aperture 14 and about that portion of the nozzle 46 which projects therein in a smooth swirling high velocity flow. This flow picks up the gas delivered to and through the nozzle immediately on its exit therefrom and causes it to substantially immediately impact therewith on the baffle 66. This produces a most effective breakdown of the discharging gas and a very high turbulence of the gas entraining primary air. The result is a dissemination of the gas throughout the impacted air the degree of which is extremely high. This is apparently due to the violently turbulent pattern in which the mixture takes place substantially immediately of the discharge of the gas from the nozzle 46. The pattern of the intermixture and breakdown of the gas at and behind the baffle 66 is particularly efficient when utilizing the preferred spacing and arrangement of the parts of the assembly comprised in the rear head of the combustion chamber. There is an upexpectedly most complete mixing of the air and fuel. This mixture is inherently maintained in a high velocity flow condition as it is moved to and beyond the radially outermost limit of the baffle 66, at which point the secondary air flowing inwardly of the combustion chamber by way of the apertures 19 peripherally envelops the primary air fuel mixture. This enveloping effect produces a bending of the air fuel mixture created behind the baffle immediately as it passes its radial limit, in a downstream direction.

Attention is directed to the fact that the spark plug 44 is so mounted with respect to the plate 12 as to produce its spark immediately outward of the outer peripheral edge of the baffle 66 and immediately of its downstream face. The consequence of this is that the gas is ignited to produce a flame in an optimal environment substantially immediately of that point in time it clears the baffle and closely adjacent the face 16 of the plate 12.

As will be seen, a portion of the pressured flow of air developed upon rotation of the fan assembly 96 is applied substantially directly to and through the apertures 19. Consequently, the ring form of the arrangement of the apertures 19 produces a directed flow of air in, the length of and coextensive with the outer periphery of the combustion chamber 30. This peripheral layer of secondary air so provided has a multiple effect. First it peripherally contains the primary air and gas during the violent intermixture thereof immediately of the plate 12 and behind the baffle 66. Secondly, it supports the ignition which occurs as it bends the air fuel mixture about the outer edge of the baffle and it then encompasses the resultant flame to not only insure essentially complete combustion within the immediate vicinity of the plate 12 and the baffle but a retention of the flame essentially within the rear half of the combustion chamber. This peripheral layer of secondary air also interposes a protective layer of insulation as between the flame and the heat shield one effect of which is that the interior surface of the shell 10 is maintained essentially free of any soot or other deposit such as normally occurs in the operation of a heater of the type with which we are here concerned. An ancillary effect on the cylinder of air which moves between the flame and the inner wall surface of the combustion chamber is that its essential heat transfer capacity, as between it and the flame which it envelops in a peripheral sense, is maintained in an optimal condition and by reason of the pattern of its flow the amount and degree of heat transferred to and by the heat shield to the annular passage between it and the outer surface of the housing results in the maintenance of both the heat shield and the outer surface of the housing at a distinctly reduced temperature level as compared to that which is normally encountered in the operation of an LP gas heater.

In fact, tests have shown that the secondary air moved to and through the apertures 19 in the arrangement described has kept the inner wall surface of the combustion chamber clean. Another effect has been to dilute and make the combustion gases safer. Furthermore, the possibility of explosion due to overheating has been eliminated.

Attention is directed to the face that in the use of a nozzle in connection with the plate 12 per the present invention there need be no special concern or construction which requires a critical position of rotation of the nozzle with reference to its associated structure.

Attention is also directed to the fact that no secondary combustion chambers are required, nor are baffles at the discharge end of the combustion chamber, which is completely open for effective full discharge of heated air for an optimal issuance and spreading thereof to serve its intended purpose, essentially to enable the heat embodied therein to produce a safe and effective result. It should be self-evident that more uniform temperatures as well as safer temperatures will be produced in the use of the heater. An interesting effect in the use of the improvements of the invention is that when the heater is turned off the residual heat in the vicinity of the heater will be quite limited and there will be no residual danger.

By reason of the absence of nose cones or any other afterburner type structure or baffles at the outer end of the heater, one of course reduces the cost of the heater.

Most importantly, the heater components have been reduced to simplistic forms thereof making them easy to machine and assembly.

In any case embodiments of the invention exemplified by that herein illustrated exhibit not only simplicity and economy of fabrication and ease of assembly and disassembly but also an important interrelation of essential features with heretofore inobvious and most beneficial results in respect to performance, BTU output, minimalizing of maintenance requirements and safety. Of particular significance is the fact that with the most simple of improvements the invention provides a maximized usage of the energy content of the fuel employed.

Accordingly, in developing the present invention, the same has been achieved inobviously and contrary to basic teachings of the prior art and at the same time there has been produced a heater, particularly one capable of burning LP gas or its equivalent, the heat output capabilities of which greatly enhance a more general application and beneficial results in the use of LP gas or the like for space heating purposes.

From the above description it will be apparent that there is thus provided a device of the character described possessing the particular features of advantage before enumerated as desirable, but which obviously is susceptible of modification in its form, proportions, detail construction and arrangement of parts without departing from the principle involved or sacrificing any of its advantages.

While in order to comply with the statute the invention has been described in language more or less specific as to structural features, it is to be understood that the invention is not limited to the specific features shown, but that the means and construction herein disclosed comprise but one of several modes of putting the invention into effect and the invention is therefore claimed in any of its forms or modifications within the legitimate and valid scope of the appended claims.

The embodiments of the invention in which an exclusive property or privilege is claimed are defined as follows:

1. Heater apparatus particularly advantageous for use in providing an LP gas burning portable heater comprising means defining a combustion chamber having an inlet end and a discharge end, said inlet end being defined by plate structure having an inlet opening for the delivery therethrough of the primary air required for support of combustion within said chamber, a nozzle having means for connection thereof to and to discharge therefrom a supply of fuel, said means to discharge fuel providing for exit of the fuel from a portion of said nozzle which is projected inwardly of said primary air inlet opening to said chamber, means for igniting fuel delivered to said chamber in the presence of said primary air, means upstream of said plate structure for producing a flow thereto of air under pressure, said plate structure having therein a group of apertures defining inlets to said chamber for secondary air, said apertures being located within and adjacent the outer peripheral limit of said chamber, arranged in a single substantially ring-like pattern, the portion of said plate structure defining the inlet end of said chamber being essentially free of air inlets between said primary air inlet opening and said single ring-like pattern of apertures, said means to deliver a pressured flow of air being arranged to direct air to and through said primary air inlet opening and secondary air inlet apertures, means defining a surface within said chamber immediately of and transverse to said nozzle, in a closely adjacent relation to the fuel dis- charged therefrom and in line with said primary air inlet opening, said primary air, in the delivery thereof through said primary air inlet opening, passing immediately of said nozzle to intersect fuel exiting from said nozzle substantially immediately of said transverse surface to carry the fuel therewith as it impacts on said transverse surface to produce a turbulent intermixture of said air and fuel and a spread thereof laterally to move out of the outer peripheral limit of said transverse surface for a substantially instant ignition thereof immediately adjacent the outer peripheral limit of said transverse surface, and said single substantially ring-like arrangement of secondary air inlet apertures being arranged to provide a directed flow of secondary air passing to and through said chamber substantially encircling and containing the intermixture of air and fuel at ignition and the products thereof.

2. Apparatus as in claim 1 wherein said secondary air inlet apertures which are located in said plate structure together with said primary air inlet are commonly in free and open communication with the inlet end portion of said combustion chamber in an arrangement providing that the secondary air serves to envelope the turbulent intermixture of primary air and fuel from the point of its entry to said chamber.

3. Apparatus as in claim 2 wherein said transverse surface is provided by a disc-like element fixed to and transversely of said nozzle immediately downstream of the fuel exiting from said nozzle and the dimension and shape of said disc-like element is such to provide for its direct insertion into said combustion chamber, together with said nozzle, by way of said primary air inlet opening.

4. Apparatus as in claim 3 wherein said nozzle is mounted to a narrow strap-like bracket which bridges said primary air inlet opening and forms part of a nozzle assembly, the other parts of which include said nozzle and said disc-like element, and is part of said inlet end of said chamber.

5. Apparatus as in claim 3 wherein said disc-like element has a diameter the dimension of which is in a ratio of about 1.9 to about 2.1 times the dimension of the lateral extent of said portion of said nozzle.

6. Apparatus as in claim 3 wherein said igniting means is a spark plug the means defining the location of the spark from which is immediately adjacent the outer peripheral limit of said transverse surface and immediately downstream thereof.

7. Apparatus as in claim 1 wherein said means defining said combustion chamber comprises a substantially cylindrical, generally tubular, shell defining its bounding, longitudinally extending, peripheral wall said plate structure bridges one end of said shell to define the inlet end wall of said combustion chamber and the opposite end of said shell is substantially unobstructed.

8. Apparatus as in claim 1 wherein said means defining said transverse surface is in a plane substantially parallel to and spaced about one inch from the plane of the inner surface of the means defining said inlet end of said combustion chamber.

9. Apparatus as in claim 1 wherein said nozzle includes a plurality of radial passages for directing fuel to discharge therefrom the discharge openings from which are spaced from said transverse surface a distance in the range of from about 0.025 to about 0.40 inches.

10. Apparatus as in claim 1 wherein said nozzle is mounted to a narrow strap-like bracket which bridges said primary air inlet opening and forms part of a nozzle assembly the other parts of which include said nozzle and a disc-like element which provides said transverse surface.

11. Apparatus as in claim 1 wherein said means defining said transverse surface is a disc-like element the surface of which most adjacent said primary air inlet opening is spaced about one inch from the primary air inlet opening to said chamber.

12. Apparatus as in claim 11 wherein said nozzle includes a plurality of radial passages for directing fuel to discharge therefrom the discharge openings from which are spaced from said transverse surface a distance in the range of from about 0.025 to about 0.40 inches.

13. Apparatus as in claim 12 wherein said means defining said transverse surface has a peripheral configuration and dimension providing for the insertion and removal thereof by way of said primary air inlet opening.

14. Apparatus as in claim 13 wherein the said peripheral dimension of said transverse surface presents a span in the range of substantially 2 to 1 with reference to the cross sectional dimension of said nozzle.

15. Apparatus as in claim 1 wherein said nozzle has a substantially cylindrical configuration, a blind axially directed bore opening at one end to receive the supply of fuel delivered to said nozzle and radial passages communicating at one end with the opposite end of said blind bore and opening outwardly from said nozzle in a transverse plane thereof the spacing of which from said transverse surface is not appreciably greater than one quarter of an inch.

16. Heater apparatus particularly advantageous for use in providing an LP gas burning portable heater comprising means defining a combustion chamber having an inlet end and a discharge end, means defining said inlet end having therein a single inlet opening for the delivery therethrough of the primary air required for the support of combustion within said chamber and further having therein a single ring of secondary air inlet apertures located adjacent and within the outer peripheral limit of said combustion chamber, a generally cylindrical nozzle having means for connection thereof to and to dis- charge therefrom a supply of fuel, said means to discharge fuel providing for exit of the fuel from a portion of said nozzle which is projected inwardly of said primary air inlet opening to said chamber, means for igniting fuel delivered to said chamber in the presence of said primary air, means upstream of said inlet end of said chamber for producing a flow thereto of air under pressure, by way of said inlet opening and said apertures, means defining a surface within said chamber immediately of and transverse to said nozzle, in a closely adjacent relation to the fuel discharged there- from and in line with said primary air inlet opening, said transverse surface being at least about one inch from the inlet end of said chamber and said fuel being arranged to exit from said nozzle in an area closely adjacent to said transverse surface, to intersect the path of the pressured flow of primary air into said chamber to be immediately picked up thereby and impacted therewith on said transverse surface to produce a highly turbulent intermixture thereof facilitating an immediate ignition and essentially complete burning of the fuel in the innermost portion of said chamber, said single ring of apertures being located to direct secondary air to contain said turbulent intermixture immediately of said inlet end of said chamber during said ignition and the products thereof following ignition.

17. Heater apparatus particularly advantageous for use in providing an LP gas burning portable heater comprising means defining a combustion chamber having an inlet end and a discharge end, plate means defining said inlet end of said chamber having an air inlet opening for the delivery therethrough of a pressured flow of primary air required to support combustion of fuel within said chamber, a substantially cylindrical nozzle adapted for connection to a supply of fuel and formed to direct fuel therethrough and discharge said fuel laterally thereof, means defining a surface disposed within said combustion chamber immediately and transversely of the downstream end of said nozzle, which is projected through said inlet opening to the interior of said chamber and to have its projected extremity terminate adjacent said inlet opening, ignition means arranged to produce a spark immediately outward and immediately downstream of the outer peripheral limit of said transversely disposed surface, the construction and arrangement providing that primary air delivered to said chamber by way of said inlet opening passes directly about said nozzle to intersect the laterally discharging fuel at a location immediately of said transverse surface and to carry said fuel to impact therewith and to break down on said transverse surface and to immediately and substantially thoroughly disseminate through the air by virtue of the high degree of turbulence produced by virtue of this impact, said transverse surface being adapted to induce the air fuel mixture so resulting to move laterally outward of the peripheral limit of said surface to be substantially immediately ignited by said igniter means in a condition and environment facilitating complete combustion of the fuel within said combustion chamber and means to direct secondary air into the inlet end of said chamber in a sleeve-like pattern to provide an insulating layer thereof which contains the fuel and air of said mixture and the products of its ignition as said secondary air is induced to move from said plate means in the direction of the discharge end of said chamber.

18. Apparatus as in claim 17 wherein said transverse surface is provided by a disc-like element fixed to the downstream end of said nozzle, the shape and dimension of which element provides for its direct application in said combustion chamber, together with said nozzle, by way of said inlet opening.

19. Apparatus as in claim 18 wherein the dimension of the diameter of said disc is in the neighborhood of twice that of the diameter of said nozzle in the portion thereof adjacent thereto.

20. Apparatus as in claim 17 wherein said transverse surface is provided by a disc element, said nozzle is mounted to a narrow strap-like bracket which bridges said primary air inlet opening and forms part of a nozzle assembly the other parts of which include said nozzle and said disc-like element.

21. Apparatus as in claim 17 wherein said nozzle includes a plurality of radial passages for directing fuel to discharge therefrom the discharge openings from which are spaced from said transverse surface a distance in the range of from about 0.025 to about 0.40 inches.

22. Apparatus as in claim 17 wherein the diameter of said nozzle has a maximum dimension approximately one-half the span of said transverse surface.

23. Apparatus as in claim 17 wherein said nozzle has a blind axially directed bore opening at one end to receive the supply of fuel delivered to said nozzle and radial passages communicating at one end with the opposite end of said blind bore and opening outwardly from said nozzle in a transverse plane thereof the spacing of which from said transverse surface is not appreciably greater than one quarter of an inch.

* * * * *

UNITED STATES PATENT AND TRADEMARK OFFICE
CERTIFICATE OF CORRECTION

PATENT NO. : 4,532,914
DATED : August 6, 1985
INVENTOR(S) : David Thomas and Eugene C. Briggs It is certified that error appears in the above-identified patent and that said Letters Patent is hereby corrected as shown below:

Col. 10, line 32, - to - is inserted following "dispose".

Col. 11, line 1, "respct" is corrected to read -- respect --;

line 42, "22" is corrected to read -- 12 --;

line 43, "simple" is corrected to read -- simply --;

line 62, "upexpectedly" is corrected to read -- unexpectedly --.

Col. 12, line 55, "face" is corrected to read -- fact --.

Signed and Sealed this

Seventeenth Day of December 1985

[SEAL]

Attest:

DONALD J. QUIGG

Attesting Officer

Commissioner of Patents and Trademarks